United States Patent
Adams et al.

(10) Patent No.: US 9,575,337 B2
(45) Date of Patent: Feb. 21, 2017

(54) ELECTRO-OPTIC MODULATOR TERMINATION

(71) Applicant: Cisco Technology, Inc., San Jose, CA (US)

(72) Inventors: Donald Benjamin Adams, Northampton, PA (US); Sean P. Anderson, Macungie, PA (US); Mark Andrew Webster, Bethlehem, PA (US); Matthew Traverso, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/569,016

(22) Filed: Dec. 12, 2014

(65) Prior Publication Data
US 2016/0170241 A1 Jun. 16, 2016

(51) Int. Cl.
*G02F 1/035* (2006.01)
*G02F 1/025* (2006.01)

(52) U.S. Cl.
CPC .................... *G02F 1/025* (2013.01)

(58) Field of Classification Search
CPC ........ G02F 1/225; G02F 1/2255; G02F 1/025; G02F 1/035; B82Y 20/00
USPC ........................................ 385/1, 2, 3, 4, 8, 9
See application file for complete search history.

(56) References Cited

U.S. PATENT DOCUMENTS

| | | | |
|---|---|---|---|
| 6,018,407 A * | 1/2000 | Hatakeyama | H04B 10/6933 327/309 |
| 6,845,198 B2 | 1/2005 | Montgomery et al. | |
| 7,187,837 B2 | 3/2007 | Gothoskar et al. | |
| 8,358,940 B2 * | 1/2013 | Kucharski | H03F 3/08 375/345 |
| 2008/0089634 A1 | 4/2008 | Mosinskis et al. | |
| 2011/0222813 A1 | 9/2011 | Webster et al. | |
| 2012/0027336 A1 | 2/2012 | Park et al. | |
| 2014/0233962 A1 | 8/2014 | Kato | |
| 2014/0341498 A1 | 11/2014 | Manouvrier | |

FOREIGN PATENT DOCUMENTS

GB 2394598 A 4/2004

OTHER PUBLICATIONS

European Patent Office, International Application No. PCT/US2015/065266 International Search Report and Written Opinion dated Mar. 10, 2016, 13 pages.

(Continued)

*Primary Examiner* — Jennifer Doan
(74) *Attorney, Agent, or Firm* — Patterson + Sheridan, LLP (57) ABSTRACT

Embodiments presented in this disclosure generally relate to an electro-optic device that includes one or more modulator portions and a terminator portion. Each modulator portion is disposed along a propagation path of an optical signal and includes a respective first doped region and one or more coupled first electrical contacts. Each modulator portion operates to modulate an optical signal propagating through the first doped region using first electrical signals applied to the electrical contacts. The terminator portion is disposed along the propagation path and proximate to at least one modulator portions, and operates to mitigate effects of droop on the propagating optical signal.

20 Claims, 8 Drawing Sheets

(56) References Cited

OTHER PUBLICATIONS

Wu et al, "A 20Gb/s NRZ/PAM-4 1V transmitter in 40nm CMOS driving a Si-photonic modulator in 0.13μm CMOS," 2013 IEEE International Solid-State Circuits Conference Digest of Technical Papers, Feb. 2013, pp. 128-129.

Milivojevic et al., "Small-size Silicon Photonic IQ modulator and low-power CMOS driver for next generation Coherent Transceivers," Network and Optical Communications (NOC), 2013 18th European Conference on and Optical Cabling and Infrastructure (OC&i), Jul. 2013, pp. 181-184.

\* cited by examiner

ELECTRO-OPTIC MODULATOR TERMINATION

TECHNICAL FIELD

Embodiments presented in this disclosure generally relate to optical modulation and, more specifically, to electro-optic modulator termination.

BACKGROUND

Many electro-optic devices exploit the free carrier dispersion effect to alter both the real and imaginary parts of the refractive index. This exploitation is used since the unstrained pure crystalline silicon does not exhibit a linear electro-optic (Pockels) effect, and the refractive index changes caused by the Franz-Keldysh effect and Kerr effect are very weak. Phase modulation in a specific region of optical devices, such as Mach-Zehnder modulators, total-internal-reflection (TIR)-based structures, cross switches, Y-switches, ring resonators, and Fabry-Perot resonators may be used to modulate the output intensity.

Free carrier concentration in electro-optic devices can be varied by injection, accumulation, depletion, or inversion of carriers. Most of the devices investigated to date exhibit some common features, such as requiring long interaction lengths (for example, 5-10 mm) and injection current densities higher than 1 $kA/cm^3$ in order to obtain a significant modulation depth.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an electro-optic device that includes one or more modulator portions and a terminator portion. Each modulator portion is disposed along a propagation path of an optical signal and includes a respective first doped region and one or more coupled first electrical contacts. Each modulator portion operates to modulate an optical signal propagating through the first doped region using first electrical signals applied to the electrical contacts. The terminator portion is disposed along the propagation path and proximate to at least one modulator portions, and operates to mitigate effects of droop on the propagating optical signal.

Another embodiment is a method that includes receiving an optical signal propagating along a length of a waveguide, applying a first electrical signal across a modulator portion of the waveguide to modulate the propagating optical signal, and applying a second electrical signal across a terminator portion of the waveguide to mitigate droop from the modulator portion during application of the first electrical signal.

Another embodiment is an electro-optic device that includes a modulator portion that extends along a length of the electro-optic device and includes a first pair of waveguides, each of the first pair of waveguides coupled to one or more respective electrical contacts and having a different doping, wherein the first pair of waveguides at least partially overlap. The modulator portion operates to modulate an optical signal propagating substantially along the length of the electro-optic device and at least partially through the overlap of the first pair of waveguides using a first electrical signal applied across the respective electrical contacts. The electro-optic device further includes a second pair of waveguides, each waveguide aligned with a respective one of the first pair of waveguides along the length of the electro-optic device, at least one waveguide of the second pair of waveguides being separated from at least one waveguide of the first pair by an undoped buffer region, the second pair of waveguides arranged to receive the modulated optical signal from the modulator portion. The second pair of waveguides operates to mitigate effects of droop on the optical signal.

Example Embodiments

Embodiments presented in this disclosure generally relate to an electro-optic device that includes one or more modulator portions and one or more terminator portions. Each modulator portion extends along a lateral direction and includes a pair of doped regions that are differently doped and partially overlap. Each modulator portion operates to modulate an optical signal propagating substantially along the lateral direction through the modulator portion and at least partially through the overlap of the doped regions, by using first electrical signals applied to the doped regions through respective electrical contacts. The respective terminator portions are disposed proximate to lateral ends of the one or more modulator portions. When driven with a second electrical signal, the terminator portions operate to mitigate effects of droop in the optical signal.

Long interaction lengths in an electro-optic device may generally be undesirable in order to achieve high levels of integration and miniaturization for fabricating low-cost, compact device arrangements. High current densities may induce unwanted thermo-optic effects as a result of heating the structure and will cause an opposite effect on the real refractive index change relative to that associated with free carrier movement, thus reducing the effectiveness of the electro-optic device.

The stray of free carriers from modulator waveguides into adjacent, undoped areas of the electro-optic device, causes a slow rise and fall of the optical signal during modulation, called "droop," due to the relatively high resistivity of the undoped areas (i.e., corresponding to a high RC time constant). The effects of this slow drift are significantly more pronounced for high efficiency and high-speed modulators, especially those providing multi-level modulation (e.g., PAM-4, PAM-8, PAM-16) using multiple, sequenced modulator segments. This effect can significantly degrade the communication ability of the modulator.

To mitigate the effects of droop in a modulator, the terminator portions are added at the lateral ends of a modulator segment. A buffer width, which separates the modulator segment from a corresponding terminator, as well as properties of the terminator (e.g., dimensions and doping concentrations), may be selected to provide desired electrical and optical properties for termination. For example, the buffer width may be selected to be relatively small so that the resistance and corresponding RC value of the undoped sections is decreased. Thus, the buffer width may be preferentially selected to control droop to a degree, so that the effects of droop are reduced to an acceptable level. Additionally, by driving the electrical contacts of the terminator with a voltage, the accumulated and/or dissipated charge from the undoped sections may also be influenced, providing another degree of control of droop and further mitigating its effects.

Figure 1:
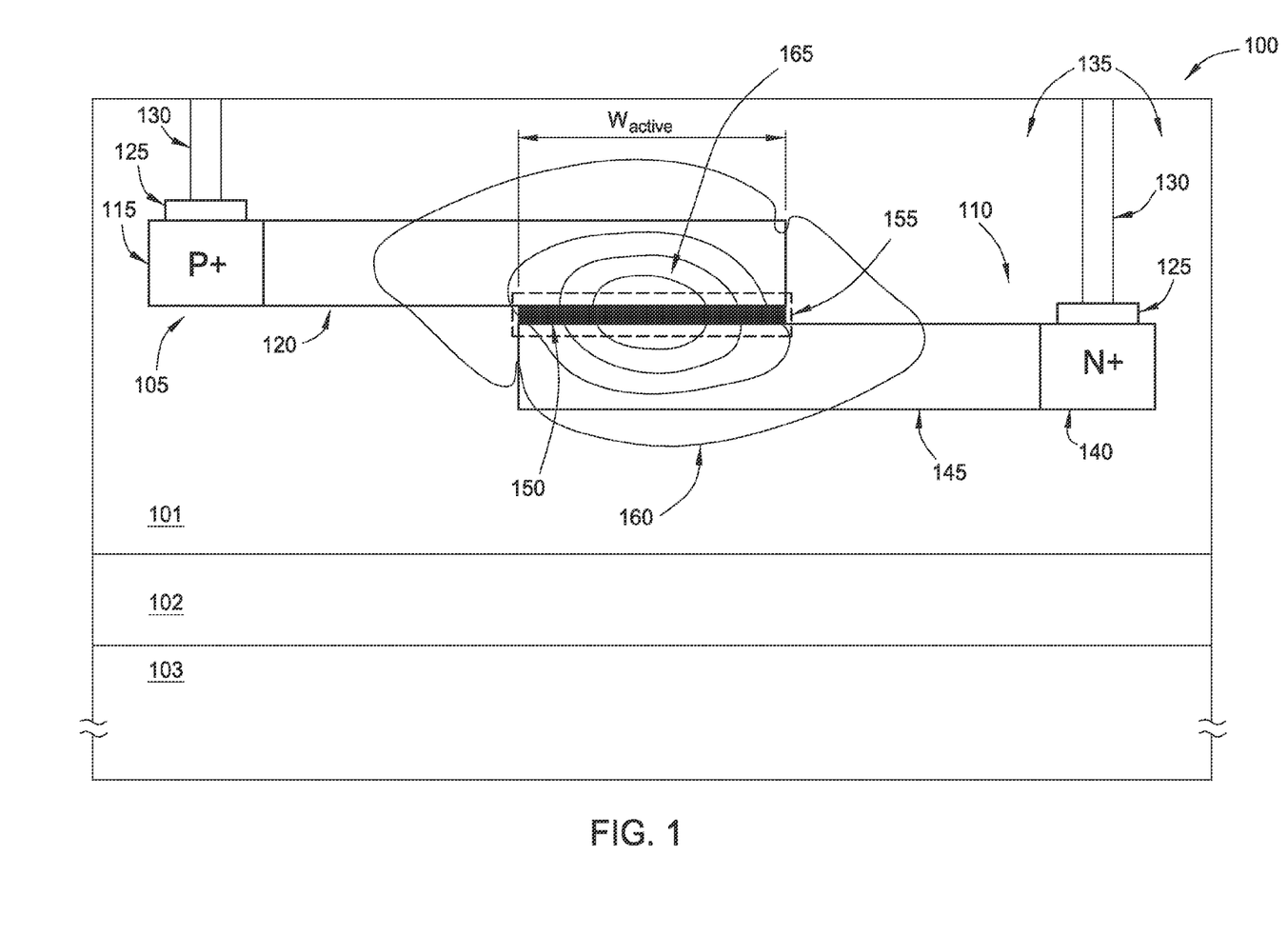
FIG. 1 illustrates a cross-sectional view of a silicon-on-insulator (SOI) electro-optic modulation device, according to embodiments described herein.

FIG. 1 illustrates a cross-sectional view of a silicon-on-insulator (SOI) electro-optic modulation device, according to embodiments described herein. Modulation device 100 includes a surface layer 101, a buried insulation layer 102 (also referred to as buried oxide (BOX) layer), and a semiconductor substrate 103. Although the embodiments herein refer to the surface layer 101 and substrate 103 as silicon, the disclosure is not limited to such. For example, other semiconductors or optically transmissive materials may be used to form the structure of modulation device 100 shown here. Moreover, the surface layer 101 and the substrate 103 may be made of the same material, but in other embodiments, these layers 101, 103 may be made from different materials.

The thickness of the surface layer 101 may range from less than 100 nanometers to greater than a micron. More specifically, the surface layer 101 may be between 100-300 nanometers thick. The thickness of the insulation layer 102 may vary depending on the desired application. The thickness of the insulation layer 102 may directly depend on the size of the mode being coupled to the modulation device 100 and the desired efficiency. As such, the thickness of insulation layer 102 may range from less than one micron to tens of microns. The thickness of the substrate 103 may vary widely depending on the specific application of the modulation device 100. For example, the substrate 103 may be the thickness of a typical semiconductor wafer (e.g., 100-700 microns) or may be thinned and mounted on another substrate.

For optical applications, the silicon surface layer 101 and insulation layer 102 (e.g., silicon dioxide, silicon nitride, and the like) may provide contrasting refractive indexes that vertically confine an optical signal in a waveguide in the surface layer 101. In a later processing step, the surface layer 101 of the modulator device 100 may be etched to form one or more silicon waveguides. Because silicon has a high refractive index compared to an insulator such as silicon dioxide, the optical signal remains primarily in the waveguide as it propagates across the surface layer 101.

Modulation device 100 may include an upper silicon waveguide 105 doped a first conductivity type (e.g., P-type) that is spaced apart from a lower silicon waveguide 110 doped a second, different conductivity type (e.g., N-type) by a gate dielectric layer 150. The arrangement of the upper waveguide 105, gate dielectric layer 150, and lower waveguide 110 forms a silicon-insulator-silicon capacitor (also referred to as SISCAP) guide that provides efficient, high-speed optical modulation of an optical signal passing through the modulation device 100. Specifically, FIG. 1 represents a cross-section of the SISCAP structure in which the optical signal travels in a direction projecting into, or out of, the page. FIG. 1 illustrates the confinement of the optical mode 160 of the optical signal by the insulation layer 102 and the dielectric material 135 (e.g., silicon dioxide or silicon nitride) surrounding the waveguides 105 and 110. Moreover, the thicknesses and widths of the waveguides 105 and 110 may be selected in order to aid the confinement of the optical mode. For example, the intensity of the optical mode 160 may generally increase when approaching a center 165 of the optical mode. By selecting properties of the waveguides, the more intense portions of the optical mode may be shaped or better confined to allow more efficient modulation of the optical signal.

The gate dielectric layer 150 establishes a charge modulation region (or charge accumulation region) 155 shown by the dashed box in which free carriers (e.g., electrons and holes) flow into and out of the p-doped and n-doped waveguides 105 and 110. Doing so creates an active region (defined by $W_{active}$) where the switching function associated with the modulation device 100 (e.g., at switching speeds of 1 Gb/s or greater, such as 10 Gb/s or 28 Gb/s) can be controlled by a voltage potential applied across the gate dielectric layer 150. In one embodiment, the voltage potential is used to alter the phase of the optical signal propagating through the modulator as in, for example, a Mach-Zehnder interferometer (MZI). However, the modulators described herein may also be used in other types of devices such as ring resonators, Fabry-Perot cavities, etc.

The gate dielectric layer 150 may be referred to as either "gate dielectric" or "gate oxide," where it is to be understood that an oxide is only an exemplary form of a dielectric that may be used in the modulator device. The gate dielectric layer 150 may comprise any material that allows for fast charging/discharging of the free carries (e.g., enables switching speeds of 1 Gb/s or greater). A non-limiting list of suitable materials include hafnium oxide, oxynitride, bismuth oxide, silicon nitride, silicon oxide, and combinations of these materials. Furthermore, using high-K dielectric materials as the gate dielectric provide higher capacitance and greater charge densities over using dielectrics with lower dielectric constants (assuming same thickness and voltage potential). For example, hafnium oxide and silicon nitride (high-K dielectrics) have higher dielectric constants than silicon dioxide, and thus, enable greater charge densities across the gate dielectric layer relative to using silicon dioxide. Using the higher voltages may increase the modulation efficiency—i.e., the amount the optical signal is phase shifted relative to the amount of voltage applied.

Although the Figures described herein illustrate placing a gate dielectric layer 150 between the opposite doped waveguides, this is not a requirement. For all the embodiments described herein, the modulators may still perform optical modulation if the gate dielectric layer 150 is omitted and the two waveguides directly contact to form a P-N junction. In this example, the P-N junction establishes the charge modulation region where the free carriers flow into and out of the waveguides. However, including the gate dielectric layer 150 may improve the efficiency of the optical modulation.

As shown, the upper waveguide 105 is doped P-type while the lower waveguide 110 is doped N-type. However, for all the embodiments where the dopant type is specified, the dopant types may be reversed—e.g., the upper waveguide 105 may be doped N-type while the lower waveguide 215 is P-type. Furthermore, the waveguides 105 and 110, which serve as electrodes for the capacitive structure of the modulation device 100, may be silicon based. For example, the material of the waveguides 105, 110 may include strained silicon, $Si_xGe_{1-x}$, substantially single-crystal silicon (i.e., crystalline silicon), polycrystalline silicon, amorphous silicon, germanium, III-V compounds (such as boron nitride, gallium arsenide, indium arsenide, etc.), as well as combinations thereof. In one embodiment, the lower waveguide 110 may include crystalline silicon while the upper waveguide 105 may be polycrystalline silicon. However, in other embodiments, both waveguides 105, 110 may be made from crystalline silicon or polycrystalline silicon.

A width of the waveguides 105, 110 may be selected to keep electrical contacts 125, which may be metallic or formed from silicide, and vias 130 disposed away from the optical mode 160. Because electrically conductive materials may have a deleterious effect on optical modulation, the waveguides 105, 110 may be designed such that any conductive contacts are sufficiently outside the boundaries of the optical mode 160. Moreover, as shown in FIG. 1, the portions of the waveguides 105, 110 disposed proximate to the contacts 125 (i.e., waveguide portions 115, 140) are more heavily doped than the portions of the waveguide 105, 110 in which the optical modulation occurs (i.e., waveguide portions 120, 145). This arrangement may improve the electrical connection between the silicon-based waveguides 105, 110 and the contacts 125, thereby decreasing the electrical resistance and related RC time constant associated with the modulation device 100. Moreover, increasingly doped portions of the waveguides disposed proximate to the electrical connection to an external voltage source may be applied to any of the embodiments described herein. Furthermore, the concentration of dopant may increase in the waveguides 105, 110 as the distance from the optical mode 160 increases. Because the dopant may have a deleterious effect on the optical signal, the dopant concentration in the waveguides 105, 110 where the optical mode is located may be lightly doped. The dopant concentration may be increased in a step-wise or a substantially continuous manner as the distance from the optical mode increases. Doing so improves the electrical conductivity of the waveguides 105, 110 and mitigates the negative effect of the dopant on the optical signal. Furthermore, in one embodiment, the electrical contacts 125 are omitted and the vias 130 contact the heavily-doped waveguide portions 115, 140 directly.

In one embodiment, the width of the active region (i.e., corresponding to the width of the gate dielectric layer 150) is less than a micron, and more specifically, less than half a micron. The thickness of the waveguides 105, 110 may range between 50-200 nanometers. In one embodiment, to center the greatest intensity of the light in the optical mode in the charge modulation region, the respective thicknesses of the waveguides 105, 110 are the same. The thickness of the gate dielectric layer 150 may range from 20 nanometers to 1 or 2 nanometers.

While one simple example of the modulation device 100 is illustrated in FIG. 1, other embodiments may include various alternative geometries that provide a desired performance of the modulation device 100. For example, other embodiments may dispose one of the waveguides 105, 110 substantially entirely above the other of the waveguides 105, 110 (i.e., in a vertical arrangement). Other embodiments may also include ridge portions on one or more of the waveguides 105, 110, which may help to further confine the optical mode 160 and improve efficiency of modulation device 100.

Figure 2:
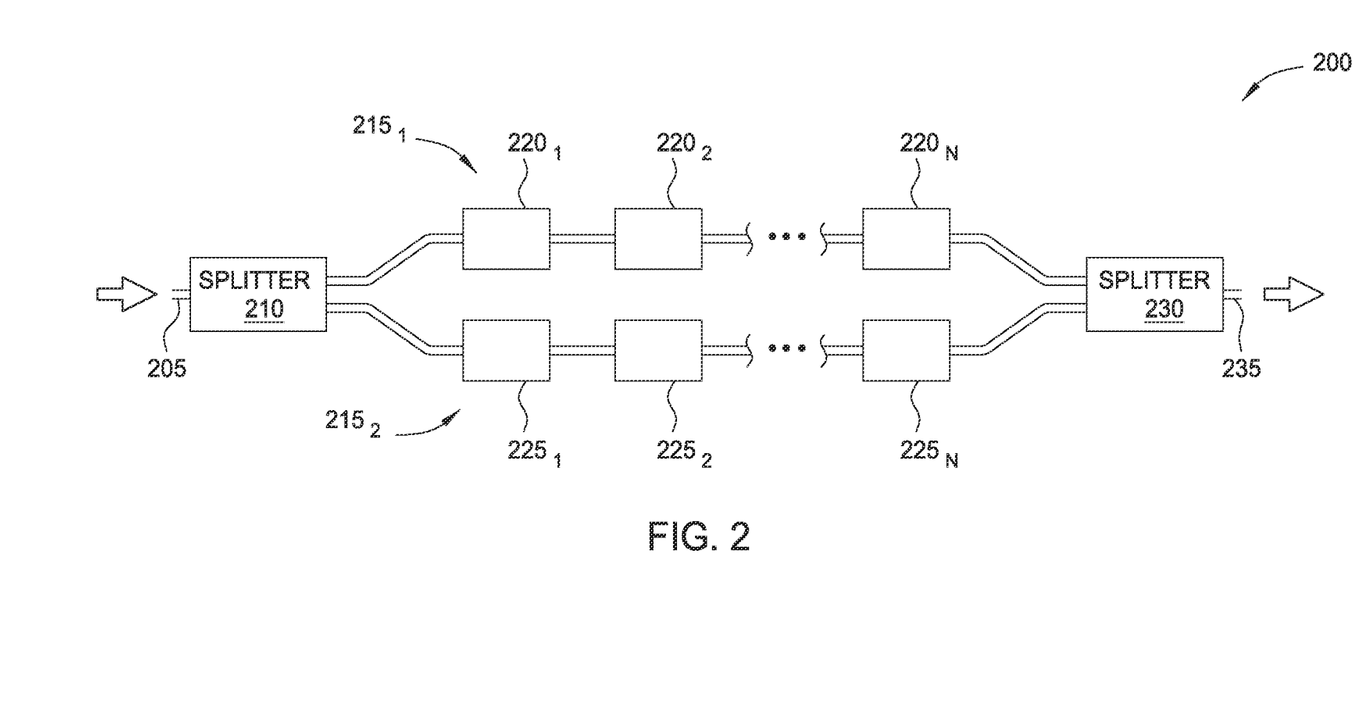
FIG. 2 illustrates a multi-segment electro-optic modulation device, according to embodiments described herein.

FIG. 2 illustrates a multi-segment electro-optic modulation device, according to embodiments described herein. Specifically, FIG. 2 illustrates an MZI-type modulation device 200 that includes an input 205 that receives an optical signal (e.g., a continuous wave signal) and an output 235 that transmits an optical signal that is modulated based on the electrical signals used to drive optical modulator segments $220_{1-N}$, $225_{1-N}$. The input 205 includes a y-splitter 210 that splits an incoming continuous wave into each of branches $215_1$, $215_2$. The split optical signals each pass through various charge modulation segments $220_{1-N}$, $225_{1-N}$ as described above. While N segments are illustrated for each branch $215_1$, $215_2$, differing numbers of modulating segments per branch are also possible. The modulated optical signals from each of the branches are then recombined using a y-splitter 230 to form a modulated output optical signal at output 235. Moreover, the structure shown in modulation device 200 may be used in conjunction with any of the modulators and features disclosed herein.

Figure 3A:
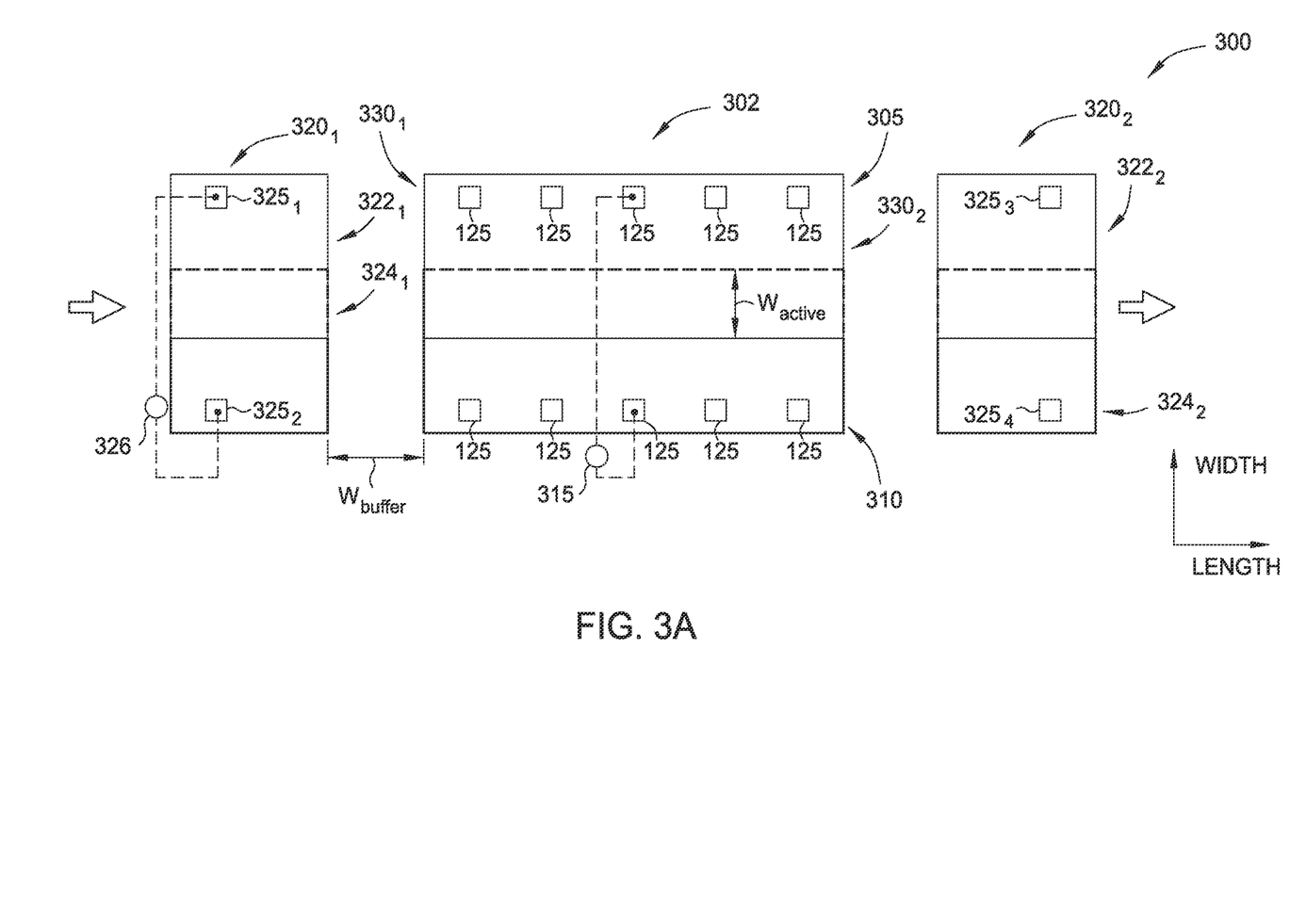
FIG. 3A illustrates an electro-optic modulation device including terminator portions, according to embodiments described herein.

FIG. 3A illustrates an electro-optic modulation device including terminator portions, according to embodiments described herein. Specifically, FIG. 3A illustrates a top view of a modulation device 302 and terminators $320_1$, $320_2$ in arrangement 300. Though only one modulation device is depicted, the modulation device 302 may be one of several modulation devices included in a multi-segment modulator providing multi-level modulation techniques, such as PAM-4, PAM-8, PAM-16, and so forth. Multi-segment modulators are discussed in additional detail below with respect to FIG. 4.

In FIG. 3A, the top surface of an upper waveguide 305 and the top surface of a lower waveguide 310 are shown. In some embodiments, the upper and lower waveguides 305, 310 may correspond to the upper and lower waveguides 105, 110 depicted in cross-section view in FIG. 1. The portion of the top surface of lower waveguide 310 that is occluded by the upper waveguide 305 is shown with a dashed outline. For clarity, any vias or dielectric (gate) material have been omitted from these views. The top surfaces include a plurality of electrical contacts 125. In one embodiment, all the electrical contacts 125 on the upper waveguide 305 are driven with a first voltage, while all the electrical contacts 125 on the lower waveguide 310 are driven with a second voltage. Of course, the electrical contacts of a particular waveguide may be driven separately. Varying the voltages between the electrical contacts of each waveguide 305, 310 causes a voltage difference (represented by voltage source 315) across the active region (i.e., $w_{active}$), which changes the free carriers in the charge modulation region and changes the phase of the optical signal traveling along the length of the modulator 302.

In one embodiment, the width of the upper waveguide 305 and the lower waveguide 310 are the same. In an alternative embodiment, the widths of the waveguides may vary. In an alternative embodiment, the upper waveguide 305 may be disposed above the lower waveguide 310 such that substantially all of the upper waveguide or all of the lower waveguide is overlapped by the other waveguide. Various alternative dimensions, geometries, and arrangements are possible for the upper waveguide 305 and lower waveguide 310. In one embodiment, the electrical contacts 125 of the waveguides may be interleaved, which may reduce the overall width of the modulator. The length of the modulation device 302 may range from 50 microns to 1000 microns. In one embodiment, when modulation device 302 is driven using voltages between about −1V and 1V, the length of the modulation device may be between about 250-450 microns.

Terminators $320_1$, $320_2$ are respectively disposed proximate to the modulation device 302 at lateral ends $330_1$, $330_2$ of the modulation device. As discussed herein, "proximate" means that the terminators are disposed at a distance from the modulation device 302 that is suitable for mitigating the effects of droop as the optical signal propagates through the modulation device. The amount of a suitable distance may vary based on the compositions, geometries, and/or electrical properties (including applied electrical signals) of the modulation device and the terminators, as well as the properties of any materials disposed therebetween. Each terminator 320 comprises a pair of doped sections 322, 324, with each doped section including one or more electrical contacts 325. Each doped section 322 may be disposed above a corresponding doped section 324 with a gate dielectric layer disposed between the doped sections (or may directly contact to form a P-N junction at the interface). The doped sections 322, 324 of the terminators 320 may have the same or a similar cross-section as that of the modulation device 302, and the terminators 320 may be aligned such that the active region (represented by $w_{active}$) remains substantially constant along the optical signal path through the terminators 320 and through the modulator device 302. In an alternate embodiment, the cross-section and/or active region of one or more of the terminators 320 may vary in order to provide desired termination effects.

In one embodiment, each of the doped sections 322 may be doped with the same type and in similar concentrations as upper waveguide 305, and each of the doped sections 324 may be doped with the same type and in similar concentrations as lower waveguide 310. In an alternate embodiment, the doping types, concentrations, and/or doping distributions of the terminator sections 322, 324 may be selected to differ from those of the modulator device 302 in order to provided desired termination effects.

The electrical contacts $325_{1-4}$ may be driven with voltage signals (represented by voltage source 326) to provide a desired voltage across the active region corresponding to each terminator 320. By providing an appropriate bias across the terminator 320, the free carriers from the modulator device may be at least partially blocked from straying into other, undoped portions adjacent to the modulator device 302. In one embodiment, a direct current (DC) voltage is applied to a terminator across electrical contacts $325_{1,2}$ (or across $325_{3,4}$). In one embodiment, voltages ranging between about −1V and 1V are driven across the modulation device 302, and terminators $320_{1,2}$ may be driven with a comparable DC voltage (e.g., 1 V). In another embodiment, the electrical contacts 325 of a terminator 320 may be grounded. In yet another embodiment, an alternating current (AC) voltage is applied across the electrical contacts 325 of terminator 320.

Portions of each terminator 320 may be spatially separated from the modulation device by a buffer width ($w_{buffer}$), which may be doped differently than the terminator 320 and/or modulation device 302, or may be entirely undoped. In some embodiments, the doped portions of modulator device 302 may be disposed in an otherwise undoped region. In some cases, undoped areas surrounding the modulation device 302 may be necessary to provide electrical isolation from other components (say, other components also formed in the surface layer of an SOI arrangement). In other words, the undoped areas generally provide a significantly larger resistance that can be used isolate one drive signal from another.

In the example of FIG. 3A, both doped sections $322_1$ and $324_1$ of terminator $320_1$ are separated from the modulation device 302 by substantially the same buffer width $w_{buffer}$. Terminator $320_2$ may be separated from the modulator device 302 by the same buffer width as terminator $320_1$ or by a different buffer width. And as will be seen in FIG. 3D, the separation between different doped sections of a terminator and the modulator device may vary. The buffer width may generally be selected from values between about zero and 10 microns. In one embodiment, the buffer width may be selected from values between about 0.1 and 5 microns. In one embodiment, the buffer width may be about 1-2 microns. In one embodiment, the buffer width may be less than 1 micron, such as about 0.1 to 0.5 microns. In one embodiment, the buffer width may be less than 0.1 microns. In one embodiment, portions of the terminator 320 may be adjacent to (i.e., directly contacting) corresponding portions of the modulator device 302, so that the buffer width is approximately zero for those portions.

Figure 3B:
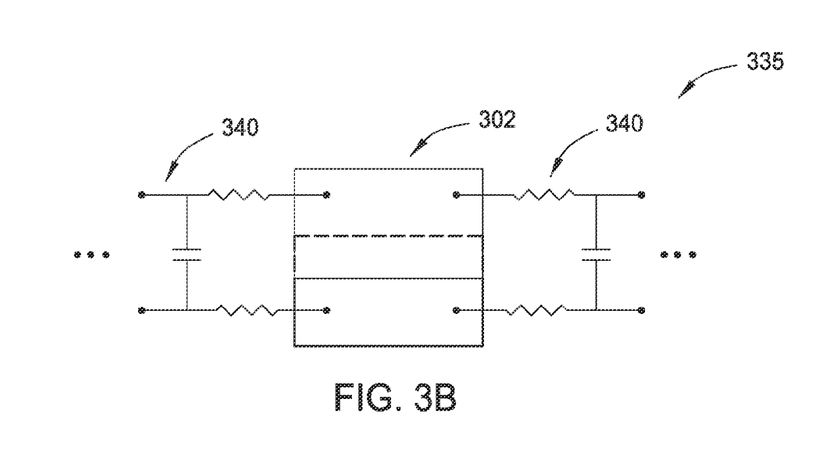
FIGS. 3B and 3C illustrate equivalent electrical circuit diagrams for an exemplary unterminated modulator device and for an exemplary terminated modulator device, according to embodiments described herein.
Figure 3C:
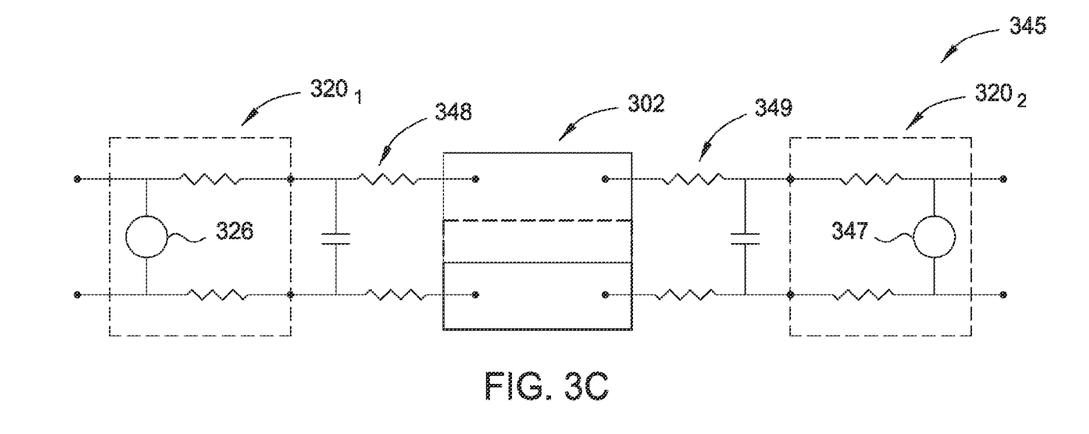

FIGS. 3B and 3C illustrate equivalent electrical circuit diagrams for an exemplary unterminated modulator device and for an exemplary terminated modulator device, according to embodiments described herein. In arrangement 335, modulator 302 is surrounded by undoped sections 340 (such as portions of surface layer 101, discussed above). The resistivity of the undoped sections 340 is relatively large when compared to the resistivity of the doped waveguides of the modulator device 302; therefore, the impedance of the undoped sections corresponds to a large RC time constant. Additionally, the voltage across the undoped sections is allowed to float. While particular examples of unterminated and terminated modulator devices were discussed here, modulator devices in some embodiments may have differing electrical properties from these examples. For instance, depending on the modulator geometry, the equivalent circuit diagrams may include diode elements (i.e., corresponding to P-N junctions) or additional resistive elements.

When modulator device 302 is driven by appropriate electrical signals to modulate an optical signal, a certain amount of free carriers (i.e., holes and/or electrons) may stray from the waveguides of the modulator device out into the surrounding undoped sections 340. Because the undoped sections have a large time constant and are not driven to a particular voltage, charge may slowly build up and/or dissipate from the undoped sections without regulation. In turn, the slow build-up and dissipation of charge tends to degrade the modulation of a passing optical signal by causing a slowly-timed rise and/or fall of the optical signal (i.e., droop). The effects of droop are especially pronounced for multi-level modulators such as PAM-4, PAM-8, PAM-16, etc. and may effectively prevent the operation of the modulator at faster modulation speeds (1 Gb/s, 10 Gb/s, 28 Gb/s, and so forth).

FIG. 3C illustrates a circuit diagram corresponding to arrangement 300 of FIG. 3A. Arrangement 345 shows the terminators $320_{1,2}$ respectively separated from the modulator device 302 by undoped sections 348, 349. The electrical properties of undoped sections 348, 349 generally correspond to the properties for the selected buffer width (which relates to a characteristic impedance for the sections). The buffer width, as well as properties of the terminators $320_{1,2}$ such as dimensions and doping concentrations, may be selected to provide desired electrical properties for termination. As discussed above, undoped sections may be necessary to provide electrical isolation of the modulator device 302. However, since the undoped sections exhibit a much larger resistivity than corresponding portions of the terminators, the buffer width may be selected to correspond to a preferred resistance (and RC value) corresponding to the undoped sections. In one example, the buffer width may be selected to be relatively small (e.g., about 1-2 microns), so that the resistance and corresponding RC value of the undoped sections is decreased, as compared to an arrangement with a modulator device 302 and no terminators 320.

The buffer width may be preferentially selected to control droop to a degree, so that the effects of droop are reduced to an acceptable level. Additionally, by driving the electrical contacts of the terminator with a voltage (e.g., using voltage sources 326, 347), the accumulated and/or dissipated charge from the undoped sections may also be influenced, providing another degree of control of droop and further mitigating its effects. Each terminator intrinsically includes a number of free carriers (i.e., electrons and holes), and this number may be adjusted by driving a voltage across the terminator. When carriers stray from a nearby modulator device into the terminator, the corresponding change in carrier concentration within the modulator device may generally be negated by the operation of the biased terminator.

Generally, signal droop may be controlled through the effect of RC time constants of regions surrounding the modulator device, whether those regions are doped or undoped. In some embodiments, the modulator devices and terminators may have properties that are substantially independent of any applied voltages. In this case, controlling doping concentrations may be used as a primary method of adjusting time constants, as this effect will greatly exceeds any effect of adjusting a voltage applied across the terminators. However, in some embodiments, the modulator devices and terminators have voltage-dependent electrical characteristics. This may be the case for most silicon-based modulators. In this case, the amount of voltage that is applied across the terminator may affect the time constant of the surrounding regions (as viewed from the modulator device). Therefore, both the doping concentrations and voltages may be selected to control time constants and to reduce signal droop.

Figure 3D:
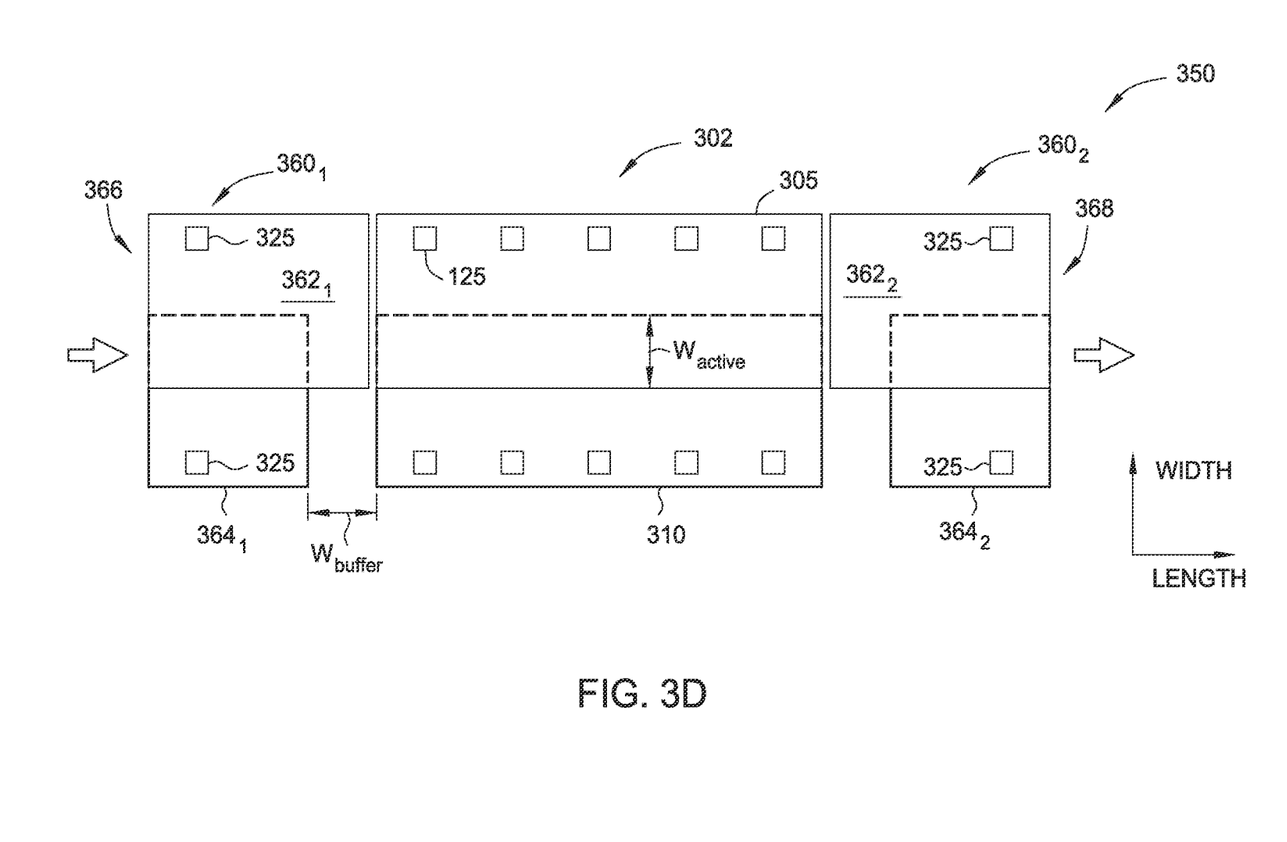
FIG. 3D illustrates an electro-optic modulation device including terminator portions, according to embodiments described herein.

FIG. 3D illustrates an electro-optic modulation device including terminator portions, according to embodiments described herein. Specifically, FIG. 3D illustrates a top view of modulation device 302 and terminators $360_1$, $360_2$ in arrangement 350. Arrangement 350 differs from arrangement 300 of FIG. 3A primarily in the size and/or the disposition of the terminators. As shown, the lower doped portion $364_1$ of terminator $360_1$ is separated from lower waveguide 310 by buffer width $w_{buffer}$, while the upper doped portion $364_2$ is substantially adjacent to the upper waveguide 305. In alternate embodiments, the upper doped portion need not be adjacent to the upper waveguide but may be separated by a width different from $w_{buffer}$. As shown, the upper doped portion $364_2$ has a length greater than that of the lower doped portion $364_1$, and both doped portions are aligned laterally at a common endface 366; terminator $360_2$ is configured similarly with endface 368. In alternate embodiments, the doped portions may not share a common endface, but one doped portion may extend laterally beyond the other. Of course, the terminators $360_{1,2}$ may include any of the features consistent with the description of FIG. 3A, such as differing widths for the doped portions.

Depending on the modulation and termination signals used, and on the properties of the materials used, portions of the terminators and the modulator device may be integrally formed. In one embodiment, the upper doped portions $362_{1,2}$ of terminators $360_{1,2}$ and upper waveguide 305 may form a singular doped region. A singular doped region may be useful where a common voltage is driven to all the corresponding electrical contacts (e.g., ground or a reference voltage). Of course, this may not be possible where a minimum buffer region is required between the terminator and a corresponding portion of the modulator device to electrically isolate the two regions.

Figure 4:
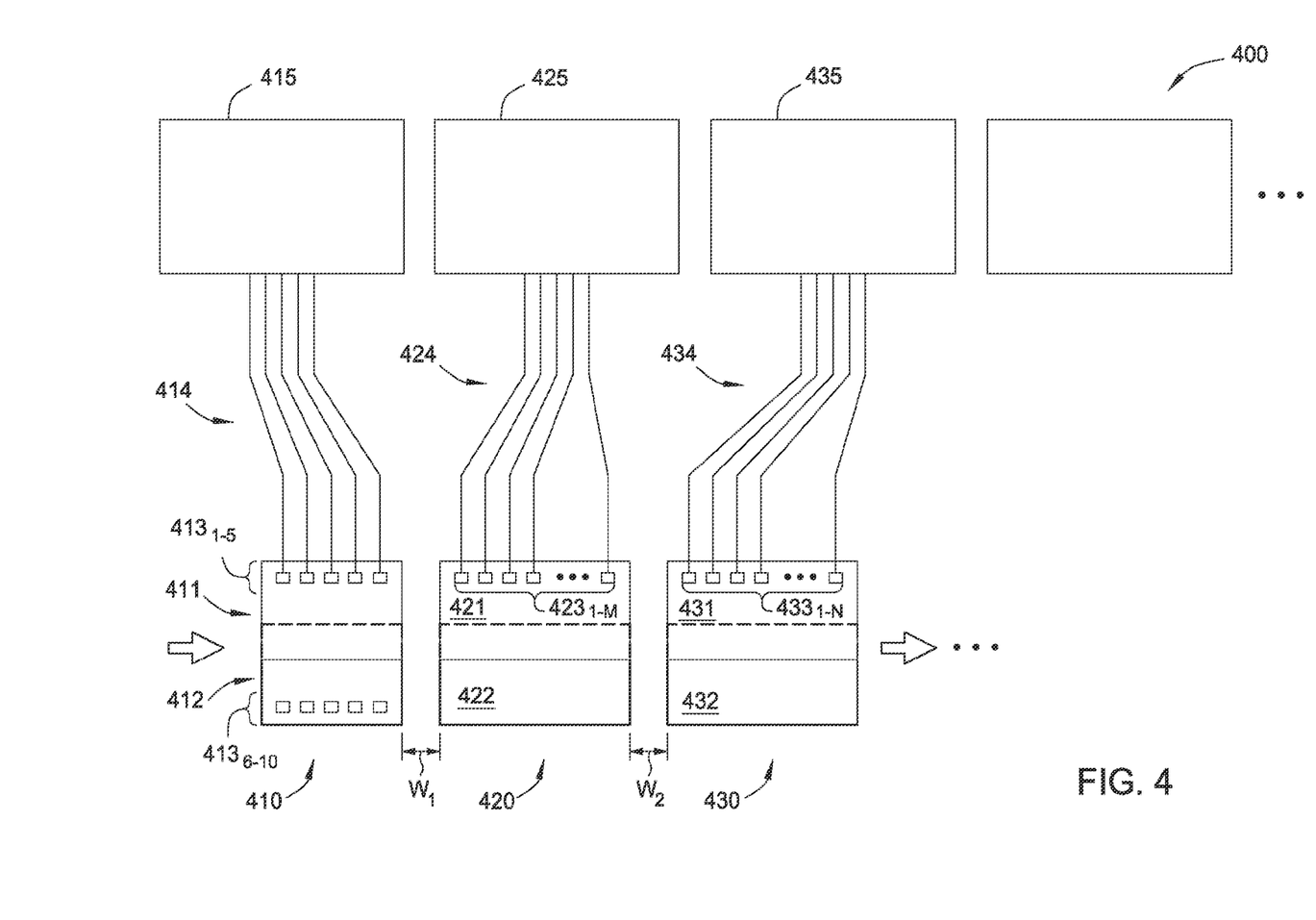
FIG. 4 illustrates a schematic view of a multi-segment electro-optic modulation device, according to embodiments described herein.

FIG. 4 illustrates a schematic view of a multi-segment electro-optic modulation device, according to embodiments described herein. In arrangement 400, a plurality of modulator devices 410, 420, 430 are connected through traces 414, 424, 434 to respective driver circuitry 415, 425, 435. Each of traces 414, 424, and 434 couples to a respective electrical contact from electrical contacts $413_{1-5}$, $423_{1-M}$, and $433_{1-N}$. For simplicity and clarity of the illustration, the corresponding traces from driver circuitries 415, 425, 435 to the electrical contacts disposed on lower waveguides 412, 422, and 432 are not shown.

As shown, modulator devices 410, 420 are separated by width $w_1$, and modulator devices 420, 430 are separated by width $w_2$, with undoped sections disposed within those separation widths. By preferentially selecting the widths $w_1$ and $w_2$, the droop occurring due to the undoped sections between the individual modulator devices 410, 420, 430 may be controlled (and its effects at least partly mitigated) by adjacent modulator devices. Similar to the structure of the terminators described above, each modulator device includes (aligned) doped sections, and is driven within electrical signals during operation. Thus, the ability to control the droop occurring at any particular modulator device may be performed by preferentially disposing a subsequent modulator device. In this example, separate terminator devices are not necessary to perform the functions of controlling droop between modulator devices. And though the driver circuitries 415, 425, 435 may drive modulation signals that vary over time, the fact that a known voltage signal is driven onto the modulator devices 410, 420, 430 may allow for further control of the charge accumulation and charge dissipation occurring in the undoped sections.

In one embodiment, terminators may be added at the ends of a sequence of modulator devices. In the example of FIG. 4, a terminator may be disposed to the left of modulator device 410, and another terminator may be disposed to the right of the last modulator device (not shown) in the sequence. Thus, the terminators may provide control of droop caused by the stray of free carriers at the lead and trail ends of the modulator device sequence, while each individual modulator device may be preferentially spaced to control droop caused by free carrier stray between modulator devices.

While the mere placement of modulator devices within a multi-segment modulator may provide some control of modulator droop, the relative proximity of the modulator devices may invoke certain electrical and optical routing considerations. In some cases, longer traces 414, 424, 434 may be required in order to couple to the modulator devices to the respective driver circuitries 415, 425, 435. As a result, additional impedance is created by the longer individual traces (e.g., resistance, self-inductance, self-capacitance) as well as the interaction between those longer traces (e.g., mutual inductance, mutual capacitance). This additional impedance may negatively impact the modulator's efficiency, requiring greater power to perform a particular amount of modulation.

Figure 5:
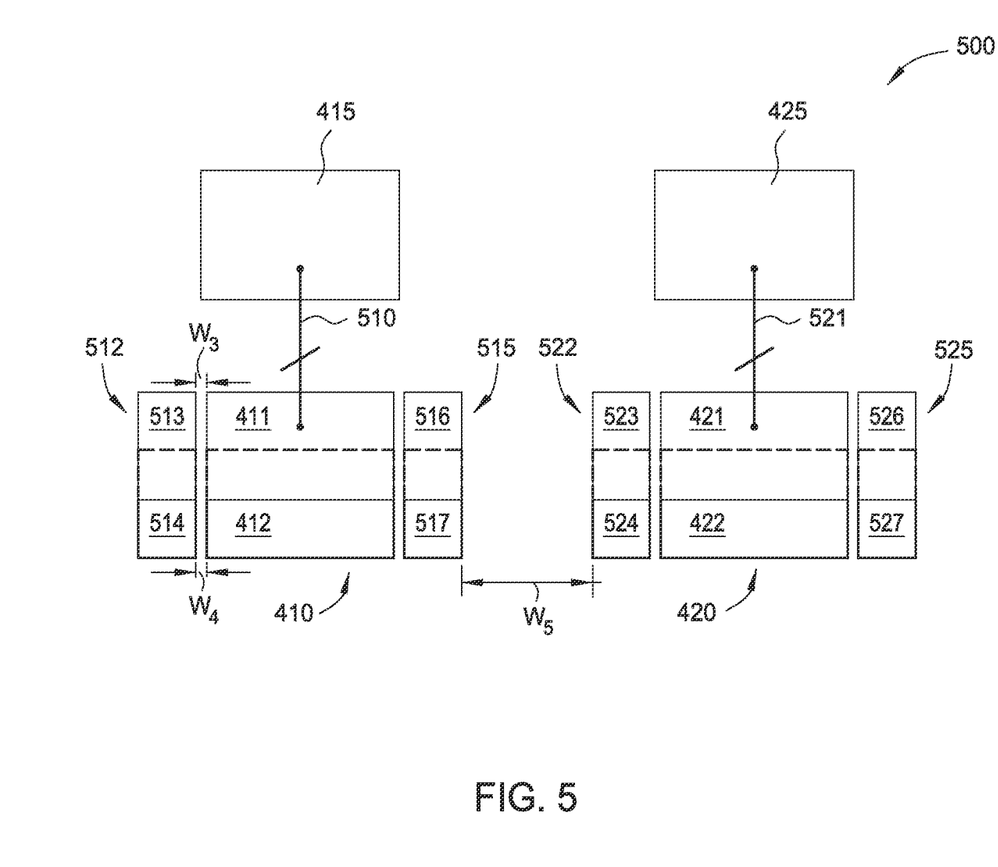
FIG. 5 illustrates schematic views of an electro-optic modulation device including terminator portions, according to embodiments described herein.

However, in some embodiments, terminators may be used to control modulator droop while maintaining a suitable trace length and configuration. FIG. 5 illustrates a schematic view of a multi-segment electro-optic modulation device including terminator portions, according to embodiments described herein.

In arrangement 500, a plurality of modulator devices 410, 420 are connected through traces 510, 521 to respective driver circuitry 415, 425. Traces 510, 521 may include multiple individual traces. Again, for simplicity and clarity of the illustration, the corresponding traces from driver circuitries 415, 425 to the electrical contacts disposed on lower waveguides 412, 422 are not shown.

Each of the terminators 512, 515, 522, and 525 is separated from the respective modulator device 410, 420 by buffer widths of the same or varying sizes. For example, the upper doped portion 513 of terminator 512 is separated from upper waveguide 411 by a width $w_3$, and the lower doped portion 514 of terminator 512 is separated from lower waveguide 412 by a width $w_4$. Consistent with the descriptions provided above, the separation widths may be the same or different, or in some cases may be zero (i.e., adjacent portions or integrally formed portions).

Between terminator 515 (corresponding to modulator device 410) and terminator 522 (corresponding to modulator device 420) is a section of waveguide having width $w_5$. This waveguide section may be undoped and exhibit high resistivity; however, due to the placement of terminators 515, 522, the droop effect caused by the undoped waveguide near the modulator devices 410, 420 may be controlled or mitigated. Having controlled or mitigated the droop effect, the width $w_5$ separating modulator devices 410, 420 may be selected to allow each modulator device to be preferentially disposed near its respective driver circuitries 415, 425. Thus, the length and/or arrangement of traces 510, 521 may be freely selected to minimize impedance of the traces, and/or based on any other routing or performance considerations for the modulator. In this regard, embodiments including discrete terminators in the sequence of modulator devices may be advantageous when compared to other embodiments in which discrete terminators are not used.

Of course, other arrangements of the terminators and modulator devices are possible. In one alternative embodiment, terminator devices and modulator devices may be disposed in an alternating arrangement. In this embodiment, a single terminator may be used to control the droop effect for two modulator devices. In another alternative embodiment, a terminator may be disposed after every n modulator devices.

Figure 6:
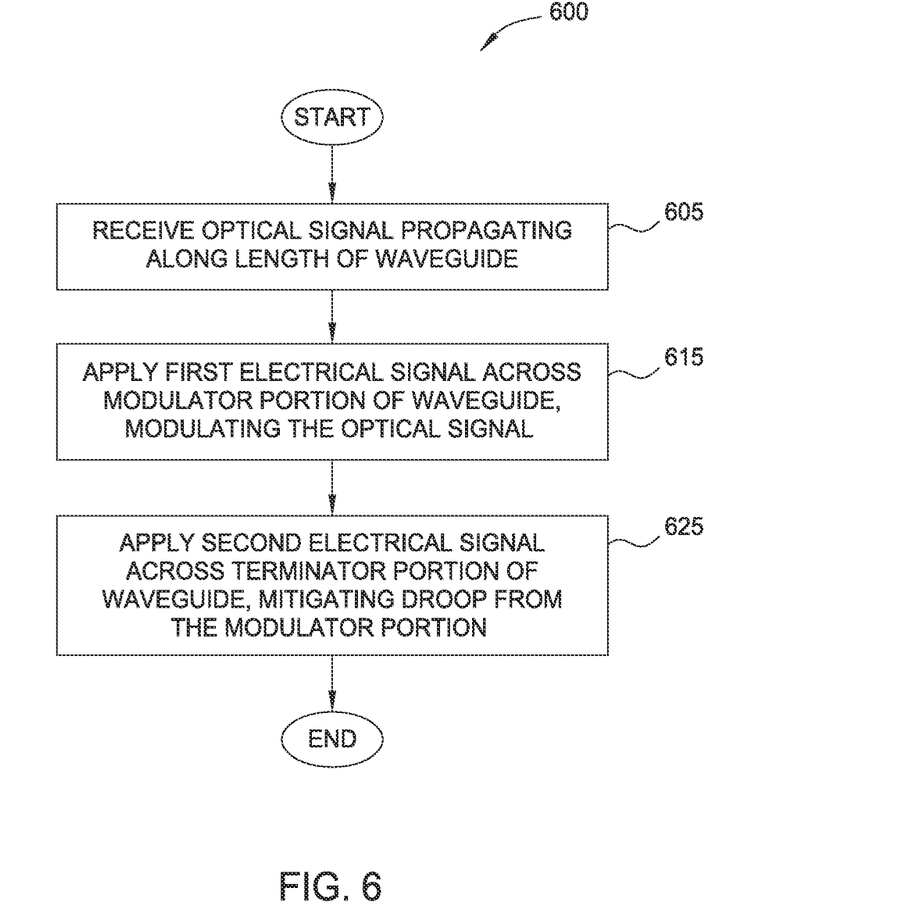
FIG. 6 illustrates a method for modulating an optical signal, according to embodiments described herein.

FIG. 6 illustrates a method for modulating an optical signal, according to embodiments described herein. Method 600 may generally be used with the various modulation devices disclosed herein.

Method 600 begins at block 605, where an optical signal is received that is propagating along a length of the waveguide. The waveguide may be comprised by a plurality of waveguide sections, each doped differently and at least partially overlapping. The waveguide sections may form a SISCAP modulator, which may include a dielectric material disposed in the overlapping region between the waveguide sections.

At block 615, a first electrical signal is applied across a first portion of the waveguide, modulating the optical signal using the free carrier dispersion effect. The first portion of the waveguide may be a discrete modulation portion that includes an electrical contact on each waveguide section, and the first electrical signal is applied across the electrical contacts.

At block 625, a second electrical signal is applied across a second portion of the waveguide. Application of the second electrical signal mitigates the droop from the first portion of the waveguide. For example, droop may be mitigated by reducing the stray of free carriers from the modulation portion into adjacent, undoped regions around the modulation portion. The second portion of the waveguide may be a second modulation section disposed in proximity to the first portion, or it may be a separate termination portion. Part of the second portion of the waveguide may be integrally formed with part of the first portion of the waveguide. In the case of a second modulation section, the second electrical signal may operate to further modulate the modulated optical signal. In the case of a termination portion, the signal may be any feasible signal, including a DC signal. Block 625 may at least partially overlap in time with block 615. Method 600 ends after completing block 625.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the figures illustrate the architecture, functionality, and operation of possible implementations of systems or methods according to various embodiments. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. An electro-optic device for modulating an optical signal propagating along a propagation path, the electro-optic device comprising:
    a first modulator portion disposed along the propagation path, the first modulator portion comprising:

a first doped region that is at least partially included within the propagation path, and
one or more first electrical contacts coupled with the first doped region,
wherein the first modulator portion is configured to modulate the optical signal propagating through the first doped region using first electrical signals applied to the one or more first electrical contacts;
a terminator portion comprising a second doped region disposed along the propagation path; and
an undoped buffer region disposed between the first doped region and the second doped region, wherein the first doped region and the second doped region are separated along the propagation path by a width of the undoped buffer region, wherein the width is selected such that the undoped buffer region and second doped region collectively present an impedance with a predetermined RC time constant to the first modulator portion to thereby mitigate effects of droop on the propagating optical signal.

2. The electro-optic device of claim 1, wherein the width of the buffer region is between about 0.1 microns and 5 microns.

3. The electro-optic device of claim 1, wherein the second doped region is coupled with a respective second electrical contact, and wherein the second doped region is further configured to, when the second electrical contact is driven with a second electrical signal, further mitigate the effects of droop on the progagating optical signal.

4. The electro-optic device of claim 1, wherein the first doped region of the first modulator portion includes a respective first pair of doped regions, wherein each doped region of the first pair of doped regions is coupled with a respective electrical contact and has a different doping, wherein the first pair of doped regions partially overlaps to define an overlap region, and wherein the overlap region is at least partially included in the propagation path.

5. The electro-optic device of claim 4, wherein the second doped region of the terminator portion comprises a second pair of doped regions, wherein each doped region of the second pair of doped regions has a different doping, wherein the second pair of doped regions partially overlaps to define a second overlap region, and wherein the second overlap region is at least partially included in the propagation path.

6. The electro-optic device of claim 5, wherein each of the first pair and the second pair of doped regions includes one doped region of a first material type, and another doped region of a second material type different from the first material type, and wherein for at least one of the first material type and second material type, the doped regions of the first pair and the second pair that have a same material type are separated by an undoped buffer region.

7. The electro-optic device of claim 1, further comprising:
a second modulator portion in series with the first modulator portion along the propagation path; and
a second terminator portion disposed proximate to the second modulator portion.

8. The electro-optic device of claim 1, wherein the first modulator portion comprises a plurality of modulator portions and wherein the termination portion comprises a plurality of terminator portions, wherein the plurality of modulator portions and the plurality of terminator portions are disposed in an alternating arrangement along the propagation path.

9. The electro-optic device of claim 1, wherein the first modulator portion comprises a plurality of modulator portions collectively configured to provide multi-level modulation of the optical signal, wherein each of the plurality of modulator portions provides a respective level of the multi-level modulation.

10. The electro-optic device of claim 1, wherein the first modulator portion, the terminator portion, and the undoped buffer region are included within a silicon-insulator-silicon capacitive (SISCAP) structure.

11. The electro-optic device of claim 1, wherein the first modulator portion further comprises a third doped region and the terminator portion further comprises a fourth doped region, wherein the third doped region and the fourth doped region are integrally formed.

12. A method, comprising:
receiving an optical signal propagating along a length of a waveguide, wherein the waveguide comprises a modulator portion and a terminator portion separated along the length of the waveguide by a width of a buffer region, wherein the width is selected such that the buffer region and the terminator region collectively present an impedance with a predetermined RC time constant to the modulator portion;
applying a first electrical signal to the modulator portion of the waveguide to modulate the propagating optical signal, wherein the impedance presented to the modulator portion provides a first mitigation of effects of droop on the propagating optical signal during application of the first electrical signal; and
applying a second electrical signal to the terminator portion of the waveguide to provide a second mitigation of effects of droop on the propagating optical signal during application of the first electrical signal.

13. The method of claim 12, wherein applying the first electrical signal and applying the second electrical signal at least partially overlap in time.

14. The method of claim 13, wherein the second electrical signal includes a direct current (DC) signal.

15. The method of claim 13, wherein each of the modulator portion and the terminator portion comprise a respective doped region, and the buffer region comprises an undoped region.

16. An electro-optic device, comprising:
a modulator portion that extends along a length of the electro-optic device, the modulator portion comprising:
a first pair of waveguides, each of the first pair of waveguides coupled to one or more respective electrical contacts and having a different doping, wherein the first pair of waveguides at least partially overlap,
wherein the modulator portion operates to modulate an optical signal propagating substantially along the length of the electro-optic device and at least partially through the overlap of the first pair of waveguides using a first electrical signal applied to the respective one or more electrical contacts; and
a second pair of waveguides that at least partially overlap, wherein the optical signal propagates at least partially through the overlap of the second pair of waveciuides, at least one waveguide of the second pair of waveguides being separated from at least one waveguide of the first pair by a width of an undoped buffer region, wherein the width is selected such that the undoped buffer region and the second pair of waveguides collectively present an impedance with a predetermined RC time constant to the modulator portion to thereby mitigate effects of droop on the propagating optical signal.

17. The electro-optic device of claim 16, wherein the second pair of waveguides is included within a second modulator portion configured to further modulate the propagating optical signal.

18. The electro-optic device of claim 16, wherein the second pair of waveguides is included within a terminator device.

19. The electro-optic device of claim 18, wherein the impedance presented to the modulator portion provides a first mitigation of effects of droop on the propagating optical signal, and wherein application of a second electrical signal to the terminator device provides a second mitigation of effects of droop on the propagating optical signal.

20. The electro-optic device of claim 16, wherein each waveguide of the second pair of waveguides are separated from a respective waveguide of the first pair of waveguides by the width of the undoped buffer region.

* * * * *

UNITED STATES PATENT AND TRADEMARK OFFICE
CERTIFICATE OF CORRECTION

PATENT NO. : 9,575,337 B2  Page 1 of 1
APPLICATION NO. : 14/569016
DATED : February 21, 2017
INVENTOR(S) : Donald Benjamin Adams et al.

It is certified that error appears in the above-identified patent and that said Letters Patent is hereby corrected as shown below:

In the Claims

In Column 13, Line 29, in Claim 3, delete "progagating" and insert -- propagating --, therefor.

In Column 14, Line 58, in Claim 16, delete "waveciuides," and insert -- waveguides, --, therefor.

Signed and Sealed this
Thirtieth Day of May, 2017

Michelle K. Lee
*Director of the United States Patent and Trademark Office*